Aug. 8, 1967   J. P. BOIKO ETAL   3,334,505
ROLL-DRIVING SPINDLE HEAD
Filed Feb. 3, 1965   2 Sheets-Sheet 1

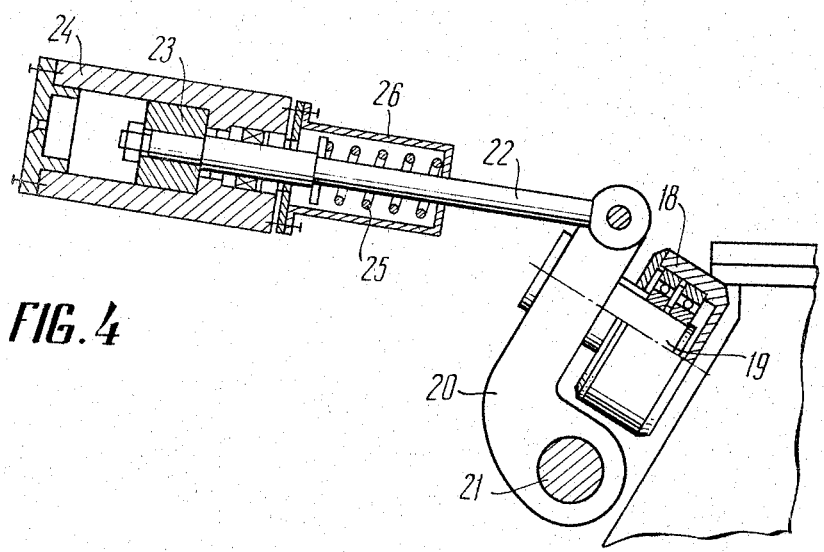
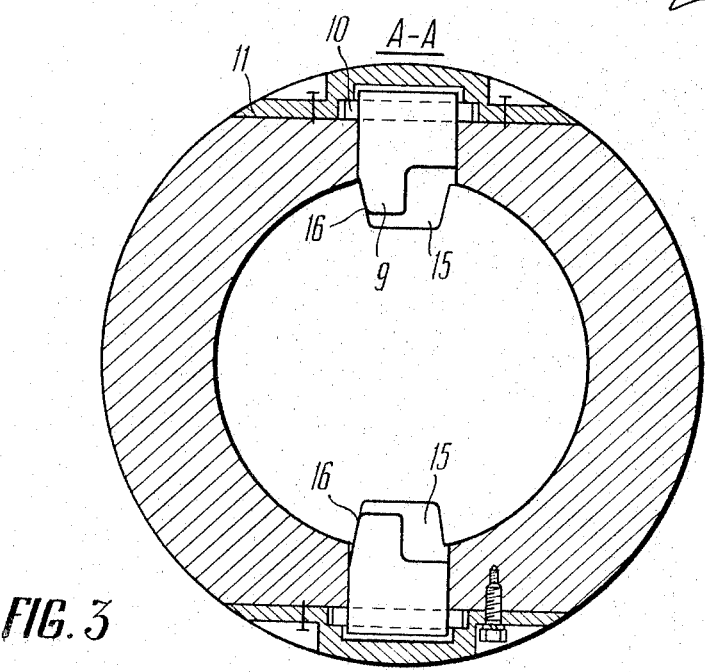

United States Patent Office 3,334,505
Patented Aug. 8, 1967

3,334,505
ROLL-DRIVING SPINDLE HEAD
Jury Pavlovich Boiko and Valentin Karpovich Potapenko, Orsk, Orenburgskaja Oblast, U.S.S.R., assignors to Juzhno-Uralsky Mashinostroitelny Zavod, Orenburgskaja Oblast, U.S.S.R.
Filed Feb. 3, 1965, Ser. No. 430,083
2 Claims. (Cl. 72—239)

ABSTRACT OF THE DISCLOSURE

This invention is directed to a roll-driving spindle head including splines transmitting torque to a roll, transverse grooves on the end of the spindle head, spring-loaded turning dogs positioned in the grooves serving for guiding the grooves up the roll and to the splines of the spindle head, and at least one working guide surface on each of the dogs, with such guide surface being an extension of the side surface of the spindle head when the dog has been retracted.

---

The present invention relates to devices for connecting the spindles with the rolls of rolling mills and more particularly to a spindle head for transmitting torque from the spindle to the roll of a rolling stand.

There are spindle heads which transmit torque to the rolls by means of a splined joint or other similar coupling.

When a roll becomes joined with such a spindle head during roll-changing, the fitting of the roll grooves onto the head splines is rather a complicated matter, thereby requiring an operator.

Such fitting can normally be achieved only by trial and error, which considerably increases the time of roll-changing and hence reduces the efficiency of rolling mills.

A device was also proposed in the art for joining spindles with rolls during the roll-changing process without manual labor. The device is essentially a spring-loaded movable bush-catcher for the driven end of the roll, and is built in the spindle head.

However, this device has certain disadvantages, and the main one is the inevitable and rather considerable increase of the overall dimensions of the spindle head due to the built-in additional movable bush. The increase of the overall dimensions of the spindles is especially undesirable in vertical rolling stands as it leads to an increase in the height and weight of the stands. Due to a considerable change in the overall dimensions of the spindles such a device could be applied only in newly designed rolling mills.

Another disadvantage of this device is the presence (on the inside and outside surface of the moving bush) of a double splined joint or a similar coupling for transmitting torque from the spindle to the roll.

An object of the present invention is to provide a spindle head capable of connecting the spindle with the roll during roll-changing, without the use of an operator and without the above disadvantages.

This object is achieved by means of spring-loaded turning dogs installed on the end part of the spindle head which has a splined or similar joint for transmitting torque from the spindle to the roll. Each of these dogs has at least one working guide surface which serves as an extension of the side surface of the spindle head spline. When the dogs are retracted, they enter the grooves on the roll and are designed to guide the roll groove onto the spindle head spline.

To ensure a positive connection between the spindle head and the roll in the process of roll-changing, each dog should have only one working guide surface and all the dogs should be arranged in such a manner as to make their working guide surfaces jointly fix the position of the roll in relation to the spindle head, thereby preventing them from relative motion. It is believed that the present invention will be clearly understood from the following description of its now-preferred embodiment and the accompanying drawings, wherein:

FIG. 3 is a cross sectional view taken along the line AA of FIG. 2 the view looking in the direction of the arrows; and FIG. 4 is a general view of a lock for holding spindles during roll-changing with the help of the proposed spindle head in vertical rolling stands.

Figure 1:
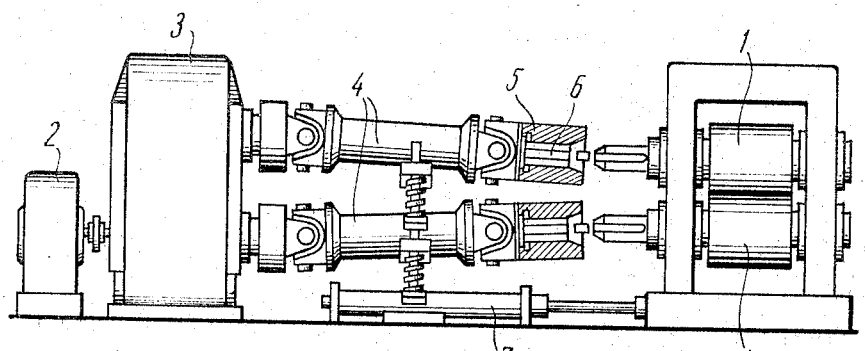
FIG. 1 is a general view of a horizontal working stand drive before joining the spindles with rolls.
Figure 2:
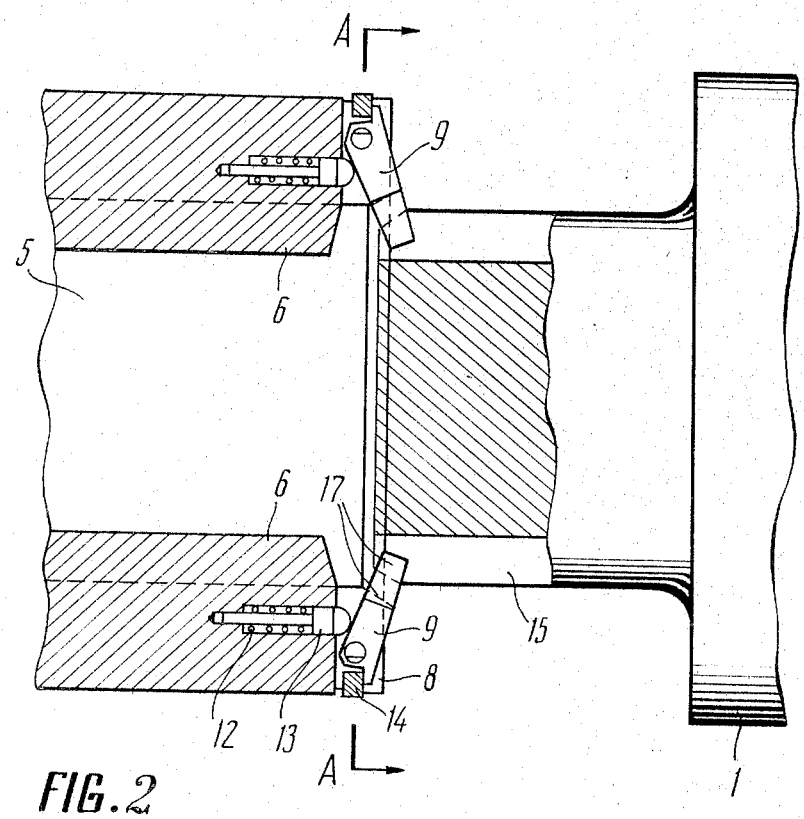
FIG. 2 is a longitudinal sectional view of the part of the spindle head.

Rolls 1 (FIG. 1) are driven by an electric motor 2 through a pinion stand 3 and a spindle 4. The end of each spindle 4 bears a head 5 designed for transmitting torque from the spindle to the roll through splines 6. Onward motion of the rolls during roll-changing is achieved by means of a special gear 7.

The end of the spindle head 5 has two dogs 9 set in grooves 8, and each dog is set on an axle 10 locked on the spindle head by means of a cover 11. The dog in the initial position is pressed against a rest 14 by a spring 12 through a rod 13. The roll 1 is provided with grooves 15 which in the working position are entered by the splines of the spindle head. The width of each dog 9 is about half the width of the groove 15 thereby facilitating entering of the groove by the dog. Thus, each dog has only one working guide surface 16.

To prevent relative turning between the roll 1 and the spindle head 5 during the process of their connection in roll-changing, the shape of one of the dogs 9 corresponds to the shape of the other as a mirror reflection, and the arrangement of the dogs on the spindle head is asymmetric about its longitudinal axis so that the working guide surface 16 of one dog prevents the roll 1 from turning in relation to the spindle head 5 in one direction, and the working guide surface of the other dog in the same position of the roller, prevents the turning of the roll 1 relative to the spindle head in the opposite direction. Both the roll 1 and the spindle head 5 are provided with chamfers 17 on their ends to facilitate the guidance of the roll in case it is not exactly coaxial with the spindle head in the original position. The admissible amount of misalignment is determined in each case by the construction of the device. Joining the roll with the spindle head during roll-changing is carried out as follows: in the initial position, the dogs 9 under the action of springs 12 are pressed against the rest 14 and project over the end of the spindle head 5. By means of a roll-changing the rolls 1 are moved onwards and brought closer to the spindle head 5 until the chamfered part 17 of the roll enters the chamfered part of the spindle head. In coming close to the spindle heads, the ends of the rolls 1 cause the spring-loaded dogs 9 to sink into the grooves 8 on the end of the spindle head 5.

When the rolls 1 are brought to a predetermined position near the spindle heads 5, a pulse, for instance, a synchro-system pulse is sent to stop the rolls, after which the spindles 4 of the drive begin to rotate. The spindles are turned approximately through 180° at a low rate (when two dogs are available as in the preferred embodiment). During rotation of the spindles the dogs 9, rotating together with the spindle heads 5 and sliding along the end of the rolls 1, come close to the roll grooves 15 and under the action of the springs 12 enter such grooves, thus carrying the roll along.

When a predetermined period of time has elapsed, the spindles stop rotating (for instance under the action of a time relay) and a command is given to move the rolls 1 further until they come into a complete contact with the spindle heads 5. In this contact, the spindle head splines 6, the profile of which corresponds to the profile of dogs 9, enter the roll grooves 15, thus completing the connection between the roll and the spindle head.

To apply the proposed spindle head in vertical rolling stands, special locks are provided for holding the spindles in the upper position.

A lock (FIG. 4) is essentially an idle roller 18 set on an axle 19 fixed in turn on a lever 20. The lever 20 rotates on an axle 21 and through a rod 22 is connected with piston 23 of a hydraulic cylinder 24, with such piston bringing it to the working position. The back stroke of the lever is effected by means of a spring 25 fixed in a sleeve 26.

The lock operates as follows: the pressure on the piston 23 of the hydraulic cylinder 24 is applied under the spindle collar through the rod 22, lever 20 and idle roller 18. Each spindle thrusts against two such rollers on which it can rotate. After roll-changing, the pressure in the working chamber of the hydraulic cylinder is removed and the spring 25 brings the lever with the roller back into the original non-working position.

The proposed spindle head permits roll-changing with a quick and positive connection between the rolls and spindles of the rolling mills and without manual labor, thus considerably reducing the roll-changing time and consequently increasing the efficiency of the rolling mills. The spindle head of the present invention can be applied both in newly designed and existing horizontal and vertical stands of rolling mills.

What we claim is:
1. A roll-driving spindle head comprising a means of transmitting torque to a roll, said means being made preferably as splines; transverse grooves on the end of the spindle head; spring-loaded turning dogs set in said grooves and intended for guiding the grooves of said roll onto the splines of said spindle head; at least one working guide surface on each of said dogs, said surface being an extension of the side surface of said spline of the spindle head when the dog has been retracted.

2. A roll-driving spindle head comprising means of transmitting torque to the roll, said means being made preferably as splines; transverse grooves on the end of the spindle head; spring-loaded turning dogs set in said grooves and intended to guide the grooves of said roll onto the splines of said spindle head; only one working guide surface on each of said dogs, said surface being an extension of the side surface of said spline of the spindle head when the dog has been retracted; and said dogs being arranged on the end of the spindle head in such a fashion that their working guide surfaces fix the position of the roll relative to that of the spindle head while they are being connected and prevents their turning with respect to one another.

No references cited.

WILLIAM W. DYER, JR., *Primary Examiner.*

GERALD A. DOST, *Examiner.*